United States Patent Office 3,655,642
Patented Apr. 11, 1972

3,655,642
WATER-SOLUBLE MONOAZO DYESTUFFS CONTAINING A NAPHTHALENE DIAZO COMPONENT
Fritz Meininger, Frankfurt am Main, and Klaus Hunger, Kelkheim, Taunus, Germany, assignors to Farbwerke Hoechst Aktiengesellschaft vormals Meister Lucius & Bruning, Frankfurt am Main, Germany
No Drawing. Filed Aug. 19, 1969, Ser. No. 851,431
Claims priority, application Germany, Aug. 24, 1968, P 17 93 275.1
Int. Cl. C09b 29/16
U.S. Cl. 260—194                                        8 Claims

ABSTRACT OF THE DISCLOSURE

A water-soluble monoazo dyestuff having in form of the free acid the formula

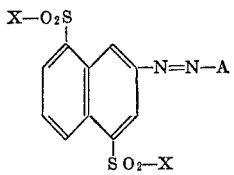

wherein X represents —CH=CH$_2$, —CH$_2$—CH$_2$—OH,
—CH$_2$—CH$_2$—O—SO$_3$H, —CH$_2$—CH$_2$—S—SO$_3$H
—CH$_2$—CH$_2$—O—PO$_3$H$_2$, —CH$_2$—CH$_2$—Cl
—CH$_2$—CH$_2$—Br, —CH$_2$—CH$_2$—O—SO$_2$—CH$_3$

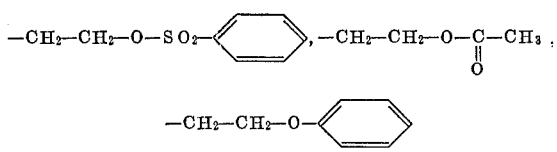

or —CH$_2$—CH$_2$—N(lower alkyl)$_2$, and A represents as a radical of a coupling component hydroxyphenylene, hydroxyphenylene substituted by lower alkyl, lower alkoxy or sulfo; hydroxynaphthylene, hydroxynaphthylene substituted by lower alkyl, lower alkoxy, sulfo, acetoacetylamino, benzoylamino, acryloylamino, 2,6-dichloro-s-triazinylamino, 2-chloro-6-amino-s-triazinylamino, 2,6-dihydroxy-s-triazinylamino, sulfoacetylamino or N-acetyl-N-methylamino; aminonaphthylene, aminonaphthylene substituted by sulfo or hydroxyl; 2-hydroxy-3-naphthoic acid anilide, 2-hydroxy-3-naphthoic acid anilide substituted on the benzene nucleus of the anilide radical by lower alkyl, lower alkoxy or chlorine or bromine; 2-hydroxy-3-naphthoic acid naphthylide, 2-hydroxy-3-naphthoic acid naphthylide substituted on the naphthalene nucleus of the naphthylide radicals by lower alkyl, lower alkoxy or chlorine or bromine; 1-phenyl-5-pyrazolone being substituted in the 3-position by lower alkyl, lower alkoxy, carb-lower alkoxy, carboxyl or carbamyl; 1-phenyl-5-pyrazolone being substituted in the 3-position by lower alkyl, lower alkoxy, carb-lower alkoxy, carboxyl or carbamyl and on the phenyl ring by chlorine, bromine or sulfo, 1-naphthyl-5-pyrazolone being substituted in the 3-position by lower alkyl, lower alkoxy, carb-lower alkoxy, carboxyl or carbamyl; 1-naphthyl-5-pyrazolone being substituted in the 3-position by lower alkyl, lower alkoxy, carb-lower alkoxy, carboxyl or carbamyl and on the naphthyl ring by chlorine, bromine or sulfo; said dyestuffs which have a high tinctorial strength being suitable for the dyeing or printing of fibrous materials consisting of wool, silk, polyamide fibres and native or regenerated cellulose fibres, the dyeings and prints obtained on said materials being distinguished by clear shades, good stability towards alkaline agents and dry cleaning, high degree of fixation and good to very good fastness properties to wetting and to light.

This invention provides new water-soluble monoazo dyestuffs which, in the form of the free acid, correspond to the general Formula 1

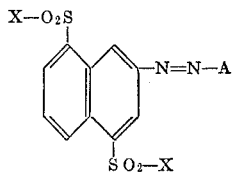 (1)

in which A represents the residue of a coupling component of the benzene, naphthalene, acetoacetic acid arylamide, pyrazolone or quinoline series and X represents the grouping —CH=CH$_2$ or —CH$_2$—CH$_2$—Y, in which Y represents a hydroxyl group or an inorganic or organic residue capable of being split off by the action of an alkaline agent, and also a process for their manufacture. The residues represented by the symbol X in the two groupings —SO$_2$—X can be identical or different.

The new monoazo dyestuffs of the above general Formula 1 can be obtained by diazotizing amines of the general formula

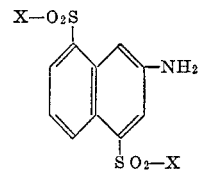 (2)

in which X has the meaning given above, in the usual manner, for example, with sodium nitrite and in mineral acid, coupling in an aqueous medium with coupling components of the general Formula 3

H—A (3)

(A having the meaning given above) and, if necessary, esterifying the hydroxyl groups of groupings of the formula

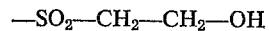

—SO$_2$—CH$_2$—CH$_2$—OH (for —SO$_2$—X) that may be present with a sulphating or phosphorylating agent.

The following compounds are given as examples of coupling components H—A:

Acetoacetic acid anilides or -naphthylides which may be substituted in the aromatic nucleus of the anilide or arylide radical, for example by chlorine or bromine atoms and/or lower alkyl or lower alkoxy groups, furthermore phenols such as hydroxy- or di-hydroxy-benzene compounds which may be substituted in the benzene nucleus by chlorine or bromine atoms and/or sulfonic acid groups or lower alkyl or lower alkoxy groups or acetoacetylamino groups, furthermore α- or β-naphthols such as mono- or di-hydroxy-naphthalenes which may be substituted by sulfonic acid groups, lower alkyl, lower alkoxy, acetylamino, benzoylamino or acryloylamino groups, 2,6-dichloro-s-triazinylamino, 2-chloro-6-amino-s-triazinylamino or 2,6-dihydroxy-s-triazinylamino groups, sulfacetylamino or N-acetyl-N-methyl-amino groups, furthermore α- or β-naphthylamines which may additionally contain hydroxyl or sulfonic acid groups at the aromatic nucleus, furthermore 2-hydroxy-3-naphthoic acid anilides or -naphthylides which may be substituted in the anilide or naphthylide radical, for example by chlorine or bromine atoms and/or lower alkyl or lower alkoxy groups, furthermore pyrazolones, especially 5-pyrazolones which couple in the 4-position, such as 1-phenyl-5-pyrazolones which may be substituted in the 3-position by lower alkyl groups, lower alkoxy groups, the carbamyl group, the carboxy group or a carb-lower alkoxy group such as the carbomethoxy or carboethoxy group, and which may be substituted at the phenyl radial in the 1-position by sulfonic acid groups and/or by chlorine or bromine atoms, in addition hydroxy-quinolines such as 8-hydroxy-quinoline-sulfonic acids.

The following are given as examples of inorganic or organic residues, represented by the symbol Y, that can be split off by the action of an alkali:

A halogen atom, preferably a chlorine or a bromine atom, an alkyl- or aryl-sulphonic acid ester group and also acyloxy groups, for example, the acetoxy group; a phenoxy- or a dialkyl-amino group, for example, a dimethyl- or diethyl-amino group; the thiosulphuric acid ester group, the phosphoric acid ester group and especially the sulphuric acid ester group.

3 - amino - 1,5 - bis - (β - hydroxyethylsulphonyl)-naphthalene, which is used directly in the manufacture of the new monoazo dyestuffs or which is used in the preparation of further diazo components of Formula 2 above, may be obtained, for example, by using ethylene oxide to convert naphthalene-1,5-disulphinic acid into 1,5-bis-(β-hydroxyethylsulphenyl)-naphthalene, nitrating the latter in 3-position and converting the nitro group into the amino group by reduction.

The following are given as examples of suitable sulphating or phosphorylating agents that can be used to esterify the hydroxyl groups of any groupings of the formula —SO$_2$—CH$_2$—CH$_2$—OH that may be present: sulphuric acid, sulphur trioxide, phosphoric acid, pyrophosphoric acid, metaphosphoric acid, polyphosphoric acid and mixtures of phosphoric acid, phosphorus(V) oxide and phosphorus oxychloride.

The new monoazo dyestuffs obtainable in accordance with the process of the invention have high tinctorial strength and are suitable for dyeing fibrous materials made from wool, silk and polyamide fibres; they can be applied in an acid, neutral or slightly alkaline dyebath. However, they are specially suitable for use as "reactive" dyestuffs in the dyeing or printing of fibrous materials made from natural cellulosic fibres or fibres made from regenerated cellulose. The coloration of such fibrous materials is effected by printing and dyeing processes in which the dyestuffs are fixed on the fibrous material by means of an agent capable of binding acid, for example, sodium hydroxide, sodium carbonate or sodium bicarbonate, the colorations so obtained being fast to washing. Processes of the kind mentioned have been described in recent literature (cf. Melliand Textilberichte 1959, 539 and 1965, 286). The dyestuffs obtained in accordance with the invention are distinguished by clear shades and good stability towards alkalis, and also by the high degree of fixation they display on cellulosic fibres. With regard to their fastness properties, special mention may be made of their good to very good fastness to wet treatments and light and the excellent stability that the dyeings and prints display when subjected to dry cleaning.

The new monoazo dyestuffs are much superior to the monoazo dyestuffs having the most closely related structure described in German patent specification No. 1,133,051 in respect of their fastness to acid (constancy of shade) and their fastness to synthetic resin finishing.

EXAMPLE 1

51.9 parts by weight of 3-amino-1,5-bis-(β-sulphatoethylsulphonyl)-naphthalene are dissolved neutral in 400 parts of water with 15 parts by weight of sodium hydrogen carbonate. 20 parts by volume of 5 N sodium nitrite solution are added and the batch is stirred into a mixtuer of 25 parts by volume of concentrated hydrochloric acid and 200 parts by weight of ice. After 30 minutes, the excess of nitrite is removed with amidosulphonic acid, and then 35.2 parts by weight of 1-naphthol-4-sulphonic acid (70%), dissolved in 230 parts by volume of water, are added, after which the pH is adjusted to 5.5 by the addition of 116 parts by volume of 2 N sodium carbonate solution. The monoazo dyestuff so formed which, in the form of the free acid corresponds to the formula

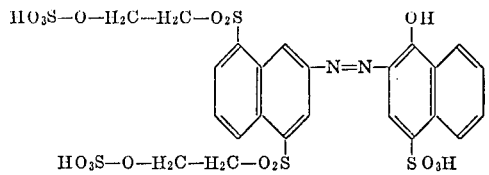

is salted out with 20% sodium chloride (referred to the volume of the solution), isolated by filtration, washed with a sodium chloride solution and dried. An orange powder that is readily soluble in water is obtained. When applied in conjunction with a compound having an alkaline action, for example, sodium hydrogen carbonate, sodium carbonate or sodium hydroxide solution, the dyestuff produces on cotton fabrics brilliant orange dyeings or prints which are highly resistant to washing and the action of light.

EXAMPLE 2

51.9 parts by weight of 3-amino-1,5-bis-(β-sulphatoethylsulphonyl)-naphthalene are diazotized in the manner described in Example 1 and then coupled with a solution of 39.2 parts by weight of 8-acetylamino-1-naphthol-3,6-disulphonic acid (92%) in 150 parts by volume of water. The pH is then adjusted to 5 with sodium hydrogen carbonate, the batch is stirred until the coupling reaction is finished and the product is then salted out with 25% potassium chloride (referred to the volume of the dyestuff solution). The monoazo dyestuff which precipitates is isolated by filtration and dried in vacuo. The product obtained is a red powder, containing salt, of the potassium salt of the dyestuff of the formula

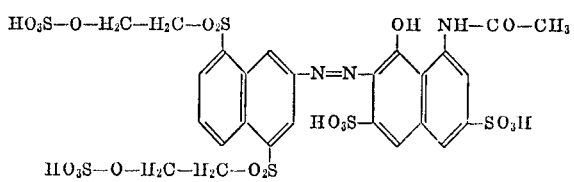

When applied to cotton in the presence of sodium carbonate, the new dyestuff produces bright red dyeings or prints possessing very good fastness to light and washing.

EXAMPLE 3

60.3 parts by weight of 3-amino-1,5-bis-(β-sulphatoethylsulphonyl)-napthalene (73%) are dissolved neutral in 300 parts by volume of water with 9 parts by weight of sodium hydrogen carbonate. 17 parts by volume of 5 N sodium nitrite solution are then added and the batch is stirred into a mixture of 200 parts by weight of ice and 25 parts by volume of concentrated hydrochloric acid. After 30 minutes, the excess nitrous acid is destroyed with amidosulphonic acid and the batch is added to a solution of 32 grams of 1-(4'-sulphophenyl)-5-pyrazolone-3-carboxylic acid (76%), dissolved neutral, in 300 parts by volume of water. The pH is then adjusted to 5 with 130 parts by volume of 2 N sodium carbonate solution and the batch is stirred for 4 hours. The product is then salted out with 25% potassium chloride (referred to the volume of the dyestuff solution), isolated by filtration, washed with a 20% potassium chloride solution and dried. A yellow powder is obtained which produces a yellow solution in water. The new monoazo dyestuff which, in the form of the free acid, corresponds to the formula

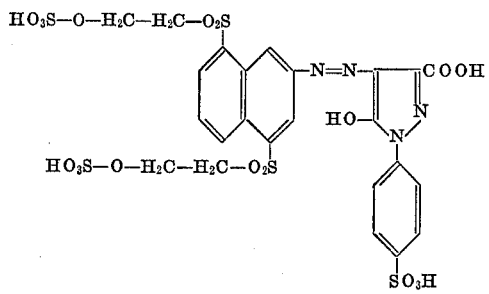

yields brilliant yellow dyeings and prints possessing very good fastness to light and washing when applied to cotton in conjunction with sodium carbonate.

EXAMPLE 4

900 parts by volume of an aqueous solution containing 20.7 parts by weight of 3-amino-1,5-(β-sulphatoethylsulphonyl)-naphthalene are diazotized by the addition of 100 parts by weight of ice, 20 parts by volume of concentrated hydrochloric acid and 8 parts by volume of 5 N sodium nitrile solution. The pH is adjusted to 4 with 22 parts by weight of sodium hydrogen carbonate and then 5 parts by weight of 4-hydroxyanisole in 200 parts by volume of water are added. The pH of the solution is then adjusted to with 2 N sodium carbonate solution. Coupling is allowed to proceed at this pH and then precipitation of the dyestuff so formed is completed by the addition of sodium chloride. The product is isolated by filtration, washed with a 20% sodium chloride solution and dried. An orange, salt-containing powder is obtained in which the monoazo dyestuff of the formula

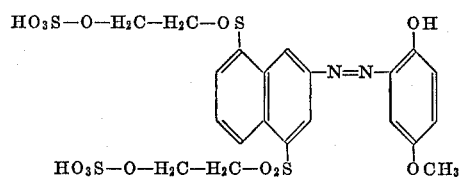

is present in the form of its sodium salt.

It produces a clear, orange solution in water and when applied to cellulosic materials in conjunction with a compound having an alkaline action it yields a clear orange dyeing possessing very good fastness to washing.

EXAMPLE 5

43 parts by weight of 3-amino-1,5-bis-(β-sulphatoethylsulphonyl)-napthalene are dissolved at pH 6 in 300 parts by volume of water with 6 parts by weight of sodium hydrogen carbonate. 25 parts by volume of concentrated hydrochloric acid are added and diazotization is effected with 15 parts by volume of 5 N sodium nitrite solution. The batch is stirred for 2 hours, excess nitrous acid is destroyed with amidosulphonic acid and then 29 parts by weight of 2-acetylamino-8-naphthol-6-sulphonic acid (82.5%) in 200 parts of water are added to the solution. The coupling reaction is allowed to proceed at pH 5 and then the product is salted out with 20% sodium chloride (referred to the volume of the dyestuff solution). The monoazo dyestuff so obtained which, in the form of the free acid corresponds to the formula

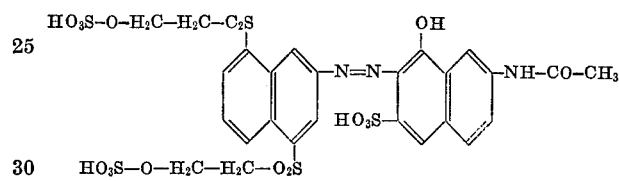

produces clear, scarlet prints on cotton possessing very good fastness to light and washing when applied in conjunction with sodium hydrogen carbonate.

EXAMPLE 6

54 parts by weight of the dyestuff obtained from diazotized 3 - amino - 1,5-bis-(β-hydroxyethylsulphonyl)-naphthalene and 1-phenyl-3-methyl-5-pyrazolene are introduced into 500 parts by volume of pyridine. The mixture so obtained is heated to 80° C. 60 parts by weight of amidosulphonic acid are added and the mixture is stirred for 30 minutes at 100 to 110° C. The pyridine is then distilled in vacuo and the residue is dissolved in 700 parts by volume of water. The pH is adjusted to 4 to 4.5 by the addition of dilute hydrochloric acid and the ester is salted out with potassium chloride.

The product is isolated by filtration, washed with a potassium chloride solution and dried.

The dyestuff so obtained corresponding to the formula

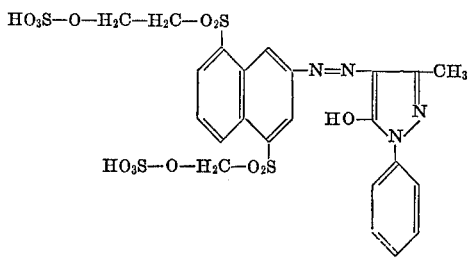

is a yellow powder which produces a yellow solution in water. The dyestuff produces strong yellow prints on cotton fabric which can be fixed fast to washing by an aftertreatment with sodium hydroxide. The solvent pyridine can be replaced by dimethylformamide, picoline or lutidino, or by mixtures thereof.

EXAMPLE 7

54 parts by weight of the dyestuff obtained from diazotized 3-amino-1,5-bis-(β-hydroxyethylsulphonyl)-naphthalene and 1-phenyl-3-methyl-5-pyrazolone are introduced into 500 parts by weight of concentrated sulphuric acid and the batch is stirred until dissolution is complete. The solution so obtained is then added to a mixture of 2,300 grams of ice and 1,200 parts by volume of water, and the esterified dyestuff is salted out with potassium chloride. It is isolated by filtration, washed with a potassium chloride solution and dried.

The dyestuff so obtained in accordance with the process of the invention has the same properties as the dyestuff described in Example 6.

The dyestuffs indicated in the following table were prepared in a manner similar to that described in the above examples and they also yield dyeings and prints on cotton that are distinguished by good to very good properties of fastness.

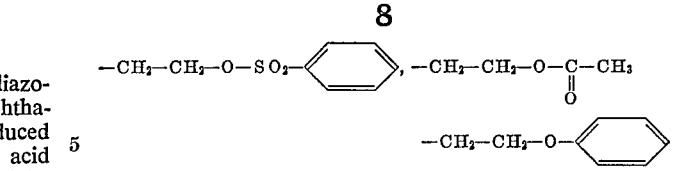

or —$CH_2$—$CH_2$—N(lower alkyl)$_2$, and A represents as a radical of a coupling component hydroxyphenylene, hydroxyphenylene substituted by lower alkyl, lower alkoxy or sulfo, hydroxynaphthylene, hydroxynaphthylene substituted by lower alkyl, lower alkoxy, sulfo, acetoacetylamino, benzoylamino, acryloylamino, sulfoacetylamino or N-acetyl-N-methylamino, aminonaphthylene, aminonaphthylene substituted by sulfo or hydroxyl, 2-hydroxy-3-naphthoic acid anilide, 2-hydroxy-3-naphthoic acid anilide substituted on the benzene nucleus of the anilide radical by lower alkyl, lower alkoxy, chlorine or bromine, 2-hy-

| Diazo component | Coupling component | Shade on cotton |
| --- | --- | --- |
| 3-amino-1,5-bis-(β-sulphatoethylsulphonyl)-naphthalene | 1-naphthol-3,6-disulphonic acid | Reddish orange. |
| 3-amino-1,5-bis-(β-diethylaminoethylsulphonyl)-naphthalene | do | Do. |
| 3-amino-1,5-bis-(β-dimethylaminoethylsulphonyl)-naphthalene | do | Do. |
| 3-amino-1,5-bis-(β-sulphatoethylsulphonyl)-naphthalene | 1-benzoylamino-8-naphthol-3,6-disulphonic acid | Bluish red. |
| 3-amino-1,5-bis-(β-thiosulphatoethylsulphonyl)-naphthalene | do | Do. |
| 3-amino-1,5-bis-(β-chloroethylsulphonyl)-naphthalene | 1-acetylamino-8-naphthol-4,6-disulphonic acid | Red. |
| 3-amino-1,5-bis-(β-acetoxyethylsulphonyl)-naphthalene | 1-acetylamino-8-naphthol-3,6-disulphonic acid | Red. |
| 3-amino-1,5-bis-(β-bromoethylsulphonyl)-naphthalene | do | Red. |
| 3-amino-1,5-bis-(β-phosphatoethylsulphonyl)-naphthalene | 1-(4'-sulphophenyl)-3-methyl-5-pyrazolone | Yellow. |
| 3-amino-1,5-bis-(β-hydroxyethylsulphonyl)-naphthalene | 1-naphthol-3,6-disulphonic acid | Reddish orange. |
| 3-amino-1,5-bis-(β-phenoxyethylsulphonyl)-naphthalene | do | Do. |
| 3-amino-1,5-bis-(β-hydroxyethylsulphenyl)-naphthalene-benzenesulphonic acid ester. | do | Do. |
| 3-amino-1,5-bis-(β-sulphatoethylsulphonyl)-naphthalene | 1-[4,8-disulphonaphthyl-(2')]-3-methyl-5-pyrazolone | Yellow |
| Do | 1-(2',5-dichloro-4'-sulphophonyl-3-methyl-5-pyrazolone | Do. |
| Do | 1-acryloylamino-8-naphthol-4,6-disulphonic acid | Red. |
| Do | 1-(2',6'-dichloro-s-triazinylamino)-8-naphthol-3,6-disulphonic acid. | Bluish red. |
| Do | 1-(2'-chloro-6'-amino-s-triazinylamino)-8-naphthaol-3,6-disulphonic acid. | Do. |
| Do | 1-acetoacetylamino-3-methyl-6-methoxybenzene-4-sulphonic acid. | Greenish yellow. |
| Do | 2-hydroxy-3-naphthoic acid anilidegg | Scarlet. |
| Do | 2-hydroxy-3-naphthoic acid-(2',5'-dimethoxyanilide) | Do. |
| Do | 2-hydroxy-3-naphthoic acid-(2'-methoxyanilide) | Do. |
| Do | 2-hydroxy-3-naphthoic acid-(4'-methoxyanilide) | Do. |
| Do | 1-hydroxynaphthalene-3-sulphonic acid | Orange. |
| Do | 1-hydroxynaphthalene-5-sulphonic acid | Reddish orange. |
| Do | 1-naphthylamine-4-sulphonic acid | Red. |
| Do | 1-acetamino-5-hydroxynaphthalene-6-sulphonic acid | Reddish orange. |
| Do | 2-aminonaphthalene-5,7-disulphonic acid | Do. |
| Do | 2-sulfoacetylamino-5-hydroxynaphthalene-7-sulphonic acid | Orange. |
| Do | 1-amino-8-hydroxynaphthalene-2,4-disulphonic acid | Reddish violet. |
| Do | 2-amino-5-hydroxynaphthalene-1,7-disulphonic acid | Orange. |
| Do | 1-(2',6'-dihydroxytriazinylamino)-8-hydroxynaphthalene-3,6-disulphonic acid. | Bluish orange. |
| Do | 2-acetylamino-5-hydroxynaphthalene-7-sulphonic acid | Orange. |
| Do | 2-acetylamino-5-hydroxynaphthalene-1,7-disulphonic acid | Do. |
| Do | 2-aminonaphthalene-6-sulphonic acid | Do. |
| Do | 2-acetylamino-5-hydroxynaphthalene-1,7-disulphonic acid | Do. |
| Do | 2-aminonaphthalene-6-sulphonic acid | Do. |
| Do | 2-aminonaphthalene-3,6-disulphonic acid | Do. |
| Do | 2-hydroxynaphthalene-3,6-disulphonic acid | Do. |
| Do | 1-[5',7'-disulphonaphthyl-(2)]-3-methyl-5-pyrazolone | Yellow. |
| Do | 2-N-acetyl-N-methylamino-5-hydroxynaphthalene-7-sulphonic acid. | Orange. |
| Do | 2-acetylamino-8-hydroxynaphthalene-3,6-disulphonic acid | Yellowish red. |
| Do | 1,8-dihydroxynaphthalene-3,6-disulphonic acid | Red. |
| Do | 1-(4'-sulphephonyl)-3-carbethoxy-5-pyrazolone | Yellow. |
| Do | 1-phenyl-3-carboxylic acid amide-5-pyrazolone | Reddish yellow. |
| 3-amino-1-(β-sulphatoethylsulphonyl)-5-β-hydroxyethylsulphonyl)-naphthalene. | 1-naphthol-3,6-disulphonic acid | Orange. |
| 3-amino-1,5-bis-(vinylsulfonyl)-naphthalene | do | Reddish orange. |

We claim:
1. A water-soluble monoazo dyestuff having in form of the free acid the formula

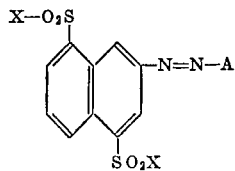

wherein X represents —CH=$CH_2$, —$CH_2$—$CH_2$—OH, —$CH_2$—$CH_2$—O—$SO_3H$, —$CH_2$—$CH_2$—S—$SO_3H$,

—$CH_2$—$CH_2$—O—$PO_3H_2$

—$CH_2$—$CH_2$—Cl, —$CH_2$—$CH_2$—Br,

—$CH_2$—$CH_2$—O—$SO_2$—$CH_3$ droxy-3-naphthoic acid naphthylide, or 2-hydroxy-3-naphthoic acid naphthylide substituted on the naphthylene nucleus of the naphthylide radical by lower alkyl, lower alkoxy, chlorine or bromine.

2. The dyestuff of the formula

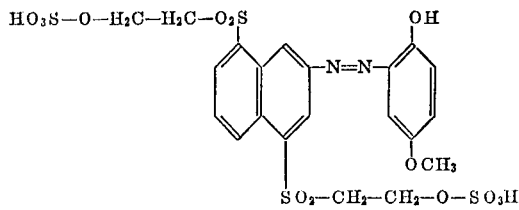

3. The dyestuff of the formula:
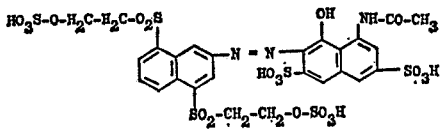
4. The dyestuff of the formula:
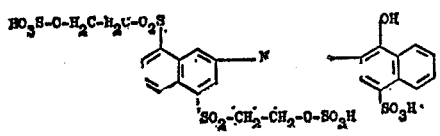
5. The dyestuff of the formula
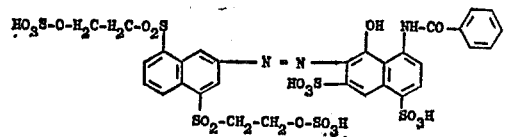
6. The dyestuff of the formula
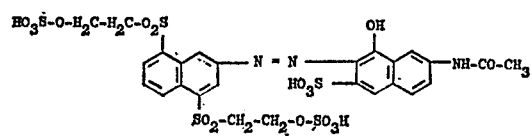
7. The dyestuff of the formula
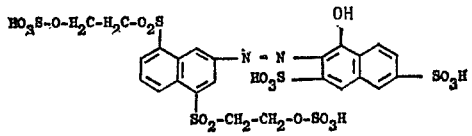
8. The dyestuff of the formula
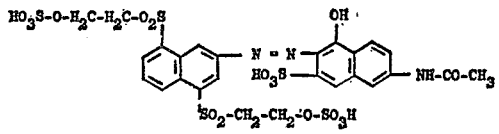
References Cited
UNITED STATES PATENTS
3,462,409   8/1969   Meininger _____ 260—194
JOSEPH REBOLD, Primary Examiner
D. M. PAPUGA, Assistant Examiner
U.S. Cl. X.R.
260—153, 155, 162, 196, 456, 457, 458, 490, 570.55, 571, 575, 578, 944